United States Patent
Santos et al.

(10) Patent No.: US 11,283,600 B2
(45) Date of Patent: Mar. 22, 2022

(54) SYMMETRICALLY ENCRYPT A MASTER PASSPHRASE KEY

(71) Applicant: HEWLETT-PACKARD DEVELOPMENT COMPANY, L.P., Houston, TX (US)

(72) Inventors: Anellena Santos, Porto Alegre (BR); Diego R. Medaglia, Porto Alegre (BR); Taciano Perez, Porto Alegre (BR); Dirceu Ramos, Porto Alegre (BR); James R. Waldron, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 844 days.

(21) Appl. No.: 16/076,203

(22) PCT Filed: Jun. 20, 2017

(86) PCT No.: PCT/US2017/038335
§ 371 (c)(1),
(2) Date: Aug. 7, 2018

(87) PCT Pub. No.: WO2018/236351
PCT Pub. Date: Dec. 27, 2018

(65) Prior Publication Data
US 2021/0176053 A1    Jun. 10, 2021

(51) Int. Cl.
*H04L 9/08* (2006.01)
*H04L 9/32* (2006.01)
(Continued)

(52) U.S. Cl.
CPC .......... *H04L 9/0836* (2013.01); *H04L 9/0822* (2013.01); *H04L 9/0863* (2013.01); *H04L 9/3226* (2013.01)

(58) Field of Classification Search
CPC .............. H04L 63/1416; H04L 63/145; H04L 63/1425; H04L 63/14; H04L 9/08;
(Continued)

(56) References Cited

U.S. PATENT DOCUMENTS

| 6,012,145 A | 1/2000 | Mathers et al. |
| 9,043,610 B2 | 5/2015 | Wang et al. |

(Continued)

FOREIGN PATENT DOCUMENTS

WO    WO-2018022091    2/2018

OTHER PUBLICATIONS

Hard Disk Passwords Explained: Should You Set one to Secure Your Files?, Apr. 14, 2014 < https://www.howtogeek.com/186881/hard-disk-passwords-explained-should-you-set-one-to-secure-your-files/ >.

*Primary Examiner* — Quazi Farooqui
(74) *Attorney, Agent, or Firm* — Fabian VanCott

(57) ABSTRACT

Examples disclosed herein relate to symmetrically encrypting a master passphrase key. In one implementation, a computing system includes a machine-readable storage medium to store a symmetrically encrypted master passphrase key, an encrypted version of a first passphrase key associated with a second machine-readable storage medium encrypted using the master passphrase key, and an encrypted version of a second passphrase key associated with a third machine-readable storage medium encrypted using the passphrase key. A processing resource may symmetrically encrypt the master passphrase key using an encryption key derived from authentication information and/or decrypt the stored master passphrase key using a decryption key derived from the authentication information.

15 Claims, 5 Drawing Sheets

(51) Int. Cl.
*H04L 9/00* (2006.01)
*H04L 9/16* (2006.01)
*H04L 9/30* (2006.01)

(58) Field of Classification Search
CPC ..... H04L 9/32; H04L 9/00; H04L 9/16; H04L 9/30; G06F 21/564; G06F 21/566; G06F 21/56
See application file for complete search history.

(56) References Cited

U.S. PATENT DOCUMENTS

| | | |
|---|---|---|
| 9,768,952 B1* | 9/2017 | Allo ...................... G06F 21/575 |
| 2005/0027989 A1 | 2/2005 | Sandhu et al. |
| 2005/0114686 A1 | 5/2005 | Ball |
| 2007/0088947 A1 | 4/2007 | Cross |
| 2007/0297608 A1 | 12/2007 | Jonas |
| 2008/0155680 A1 | 6/2008 | Guyot et al. |
| 2009/0080662 A1 | 3/2009 | Thibadeau |
| 2013/0055382 A1 | 2/2013 | Bhattiprolu et al. |
| 2014/0140508 A1* | 5/2014 | Kamath ................ H04L 9/0869 380/255 |
| 2016/0085963 A1* | 3/2016 | Birnbaum ........... G06F 9/45558 726/30 |
| 2017/0093563 A1* | 3/2017 | Gazit ................... H04L 9/0643 |

\* cited by examiner

SYMMETRICALLY ENCRYPT A MASTER PASSPHRASE KEY

BACKGROUND

An electronic device may include multiple storage devices. For example, an electronic device may include multiple self-encrypting storage devices, such as self-encrypting non-volatile memory devices. The storage devices may be unlocked at boot time of the electronic device.

BRIEF DESCRIPTION OF THE DRAWINGS

The drawings describe example embodiments. The following detailed description references the drawings, wherein.

DETAILED DESCRIPTION

In one implementation, a computing system includes multiple machine-readable storage mediums, such as self-encrypting storage devices, and individual passphrase keys for the machine-readable storage mediums are encrypted using a hierarchical encryption scheme with a symmetrically encrypted master passphrase key. The master passphrase key may be derived from authentication information, such as a user password, and the master passphrase key may be used to encrypt passphrase keys associated with machine-readable storage mediums.

Symmetrically encrypting a master passphrase key may allow authentication information to be used to derive encryption and decryption keys. For example, an encryption and decryption key for the master passphrase key may be derived based on user password or biometric information. The master passphrase key may be used to transparently unlock multiple machine-readable storage mediums associated with a device. For example, the master passphrase key may be used to decrypt encrypted passphrase keys associated with different machine-readable storage mediums, and the decrypted passphrase keys may be used to access the associated machine-readable storage mediums. The individual machine-readable storage mediums may be unlocked without the user remembering and entering multiple passwords.

A symmetrically encrypted master passphrase key may be advantageous when multiple users are associated with the same electronic device. For example, the master passphrase key may be symmetrically encrypted based on an encryption key derived from first authentication information associated with a first user, and the master passphrase key may be symmetrically encrypted based on an encryption key derived from second authentication information associated with a second user. The two versions associated with the different users may allow either user to have access to the master passphrase key for decrypting the machine-readable storage medium passphrase keys and unlocking the machine-readable storage mediums.

Figure 1A:
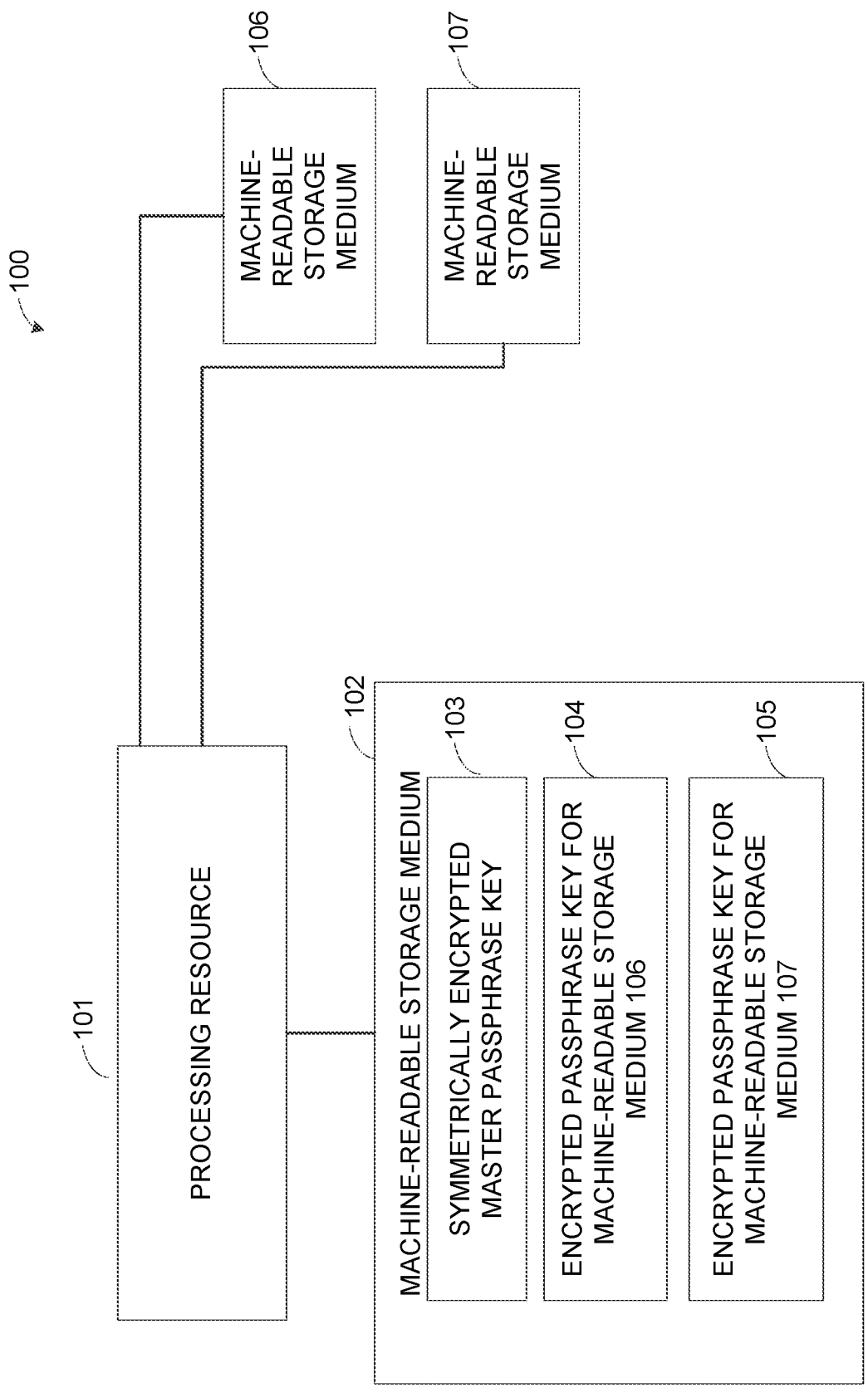
FIG. 1 is a block diagram illustrating one example of a computing system to symmetrically encrypt a master passphrase key.

FIG. 1 is a block diagram illustrating one example of a computing system to symmetrically encrypt a master passphrase key. The computing system 100 may be associated with an apparatus, such as a laptop or other computing device. The computing system 100 includes a processing resource 101, a machine-readable storage medium 102, a machine-readable storage medium 106, and a machine-readable storage medium 107.

The processing resource 101 may be platform firmware (e.g., UEFI or BIOS firmware), a central processing unit (CPU), a semiconductor-based microprocessor, or any device suitable for retrieval and execution of instructions. As an alternative or in addition to fetching, decoding, and executing instructions, the processing resource 101 may include one or more integrated circuits (ICs) or other electronic circuits that comprise a plurality of electronic components for performing the functionality described below. The functionality described below may be performed by processing resources.

The machine-readable storage medium 106 and the machine-readable storage medium 107 may be any suitable storage device that may use authentication information to protect the storage device. For example, the machine-readable storage medium 106 and the machine-readable storage medium 107 may each have a passphrase key used to gain read and/or write access. The computing system 100 may have any suitable number of machine-readable storage mediums and may store content in different machine-readable storage mediums based on content type and/or user. The machine-readable storage mediums 106 and 107 may be any suitable type of storage devices, such as NV-DIMM, a HDD, a SDD, or flash memory card. The machine-readable storage mediums 106 and 107 may be self-encrypting storage devices.

The machine-readable storage medium 102 may be a storage medium accessible to the processing resource 101. For example, the machine-readable storage medium 102 may be a machine-readable non-transitory storage medium. The machine-readable storage medium 102 may store information related to unlocking the self-encrypting storage devices 106 and 107. The machine-readable storage medium 102 may be a storage associated with platform firmware. The machine-readable storage medium 102 may store instructions executable by a processor. In one implementation, the machine-readable storage medium 102 is associated with a remote key manager. For example, an apparatus including the processing resource 101 and machine-readable storage mediums 106 and 107 may communicate with a remote key manager via a network. The remote key manager may include the machine-readable storage medium 102 and may store encrypted key information related to multiple devices, such as multiple devices in an enterprise environment.

The machine-readable storage medium 102 may store symmetrically encrypted master passphrase key 103, encrypted passphrase key 104 for machine-readable storage medium 106, and encrypted passphrase key 105 machine-readable storage medium 107. The encrypted passphrase key 104 and the encrypted passphrase key 105 may be symmetrically encrypted using the master passphrase key 103. For example, access to the master passphrase key 103 may allow for the encrypted passphrase key 104 and the encrypted passphrase key 105 to be decrypted and used to access the associated machine-readable storage mediums.

In one implementation, the processing resource 101 receives authentication information and uses the authentication information to generate an encryption key that may be used to symmetrically encrypt the master passphrase key. The authentication information may be any suitable authentication information, such as a password or biometric information. In one implementation, the authentication information is the operating system password for the computing system 100. The master passphrase key may be used to encrypt symmetrically the passphrase keys for the machine-readable storage medium 106 and the passphrase key for the machine-readable storage medium 107.

The encrypted passphrase keys 104 and 105 may be stored in the machine-readable storage medium 102 for later decryption and use. The processing resource 101 may decrypt the symmetrically encrypted master passphrase key 102. The processing resource 101 may use the decrypted master passphrase key to decrypt the encrypted passphrase keys 104 and 105. The processing resource 101 may store the decrypted master passphrase key, decrypted passphrase key for machine-readable storage medium 106, and the decrypted passphrase key for machine-readable storage medium 107 in volatile memory such that the passphrase keys for the machine-readable storage mediums 106 and 107 may be used to access the machine-readable storage mediums. For example, the decrypted passphrase key for machine-readable storage medium 106 may be used to access the machine-readable storage medium 106 to read and/or write data. In one implementation, the same passphrase key is used for unlocking multiple machine-readable storage medium, such as where a first set of machine-readable storage mediums are associated with a first passphrase key and where a second set of machine-readable storage mediums are associated with a second passphrase key.

Figure 2:
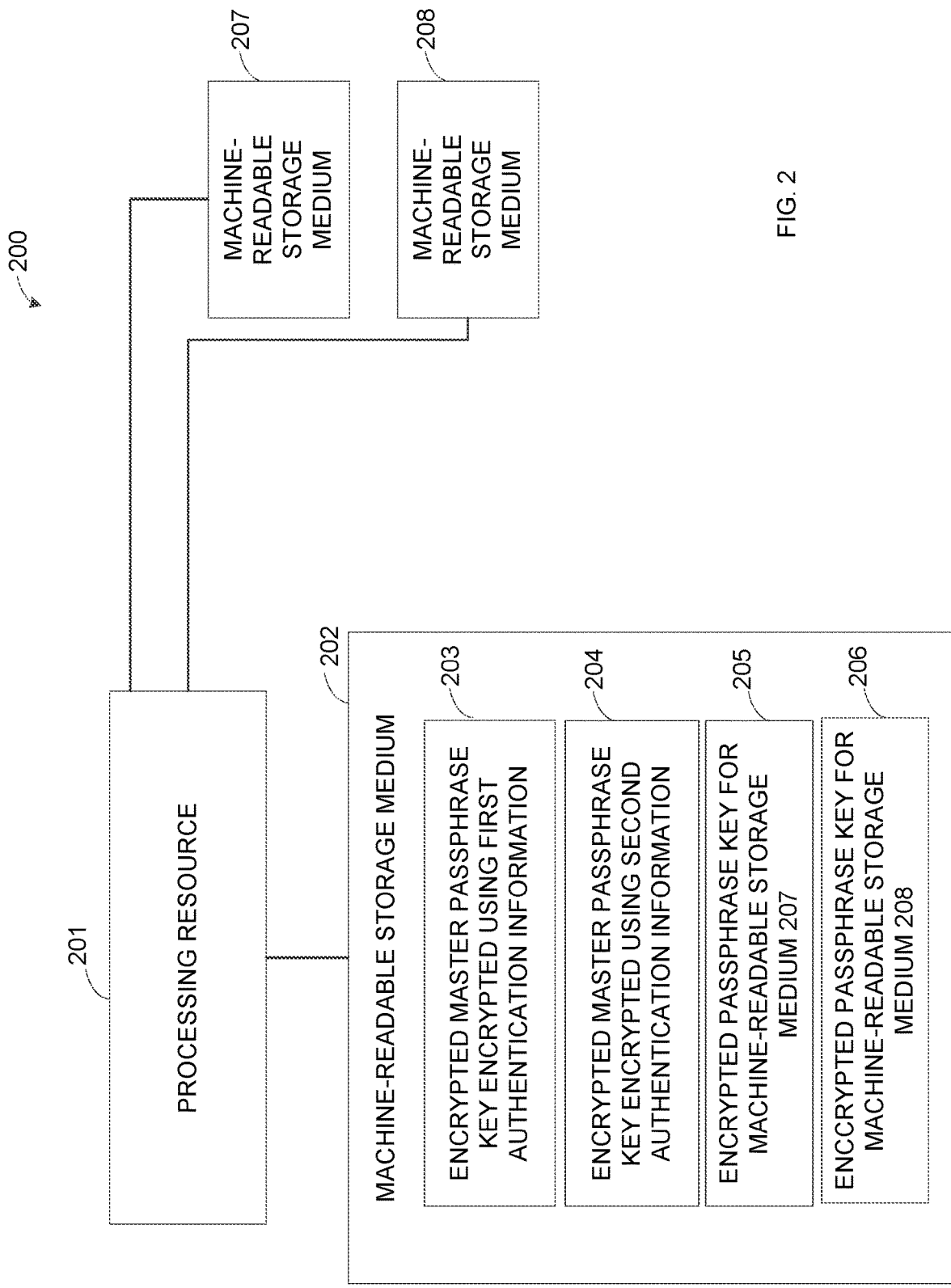
FIG. 2 is a block diagram illustrating one example of a computing system to symmetrically encrypt a master passphrase key.

FIG. 2 is a block diagram illustrating one example of a computing system 200 to symmetrically encrypt a master passphrase key. The computing system 200 may include a processing resource 201 and machine-readable storage mediums 202, 207, and 208. The computing system 200 may include multiple machine-readable storage mediums and store encrypted passphrase keys for the machine-readable storage mediums.

The processing resource 201 may be platform firmware, a central processing unit (CPU), a semiconductor-based microprocessor, or any device suitable for retrieval and execution of instructions. As an alternative or in addition to fetching, decoding, and executing instructions, the processing resource 201 may include one or more integrated circuits (ICs) or other electronic circuits that comprise a plurality of electronic components for performing the functionality described below. The functionality described below may be performed by multiple processing resources.

The machine-readable storage mediums 207 and 208 may be any suitable storage devices, such as self-encrypting non-volatile memory devices. The machine-readable storage medium 202 may be a storage medium accessible to the processing resource 201. For example, the machine-readable storage medium 202 may be a machine-readable non-transitory storage medium. The machine-readable storage medium 202 may store information related to accessing the machine-readable storage mediums 207 and 208. The machine-readable storage medium 202 may be included as part of platform firmware storage or may include instructions executable by a processor.

The machine-readable storage medium 202 includes a symmetrically encrypted master passphrase key 203 encrypted using first authentication information and symmetrically encrypted master passphrase key 204 encrypted using second authentication information. For example, the same master passphrase key may be encrypted using different authentication information to create two different versions that may be decrypted based on decryption keys derived from different authentication information. The machine-readable storage mediums 207 and 208 may each have an associated passphrase key symmetrically encrypted with the master passphrase key. For example, the machine-readable storage medium 202 may store encrypted passphrase key 205 for machine-readable storage medium 207 and encrypted passphrase key 206 for machine-readable storage medium 208. The encrypted passphrase key 205 and the encrypted passphrase key 206 may each be encrypted using the master passphrase key.

Figure 3:
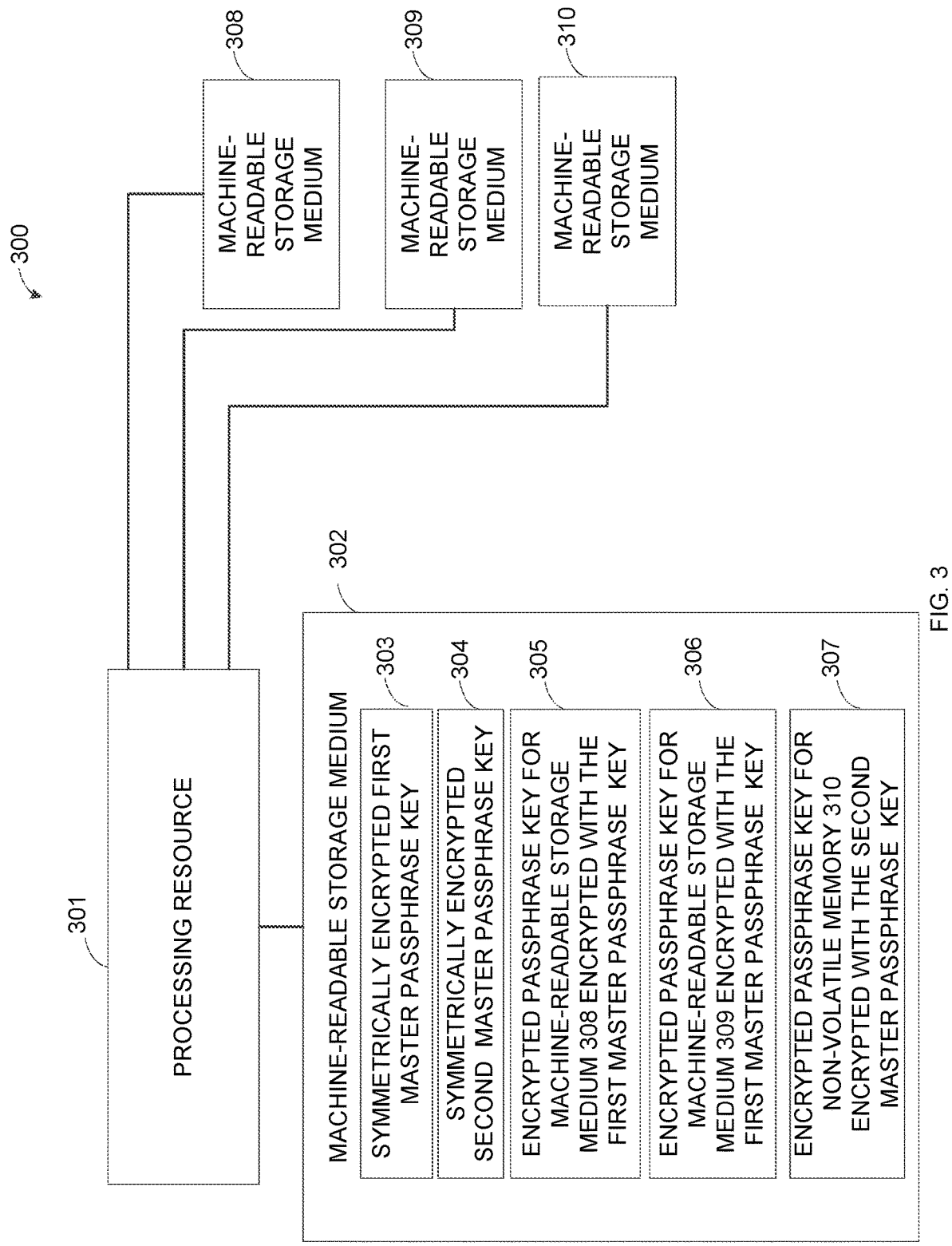
FIG. 3 is a block diagram illustrating one example of a computing system to symmetrically encrypt a master passphrase key.

FIG. 3 is a block diagram illustrating one example of a computing system 300 to symmetrically encrypt a master passphrase key. The computing system 300 may include a processing resource 301 and machine-readable storage mediums 302, 308, 309, and 310.

The processing resource 301 may be platform firmware, a central processing unit (CPU), a semiconductor-based microprocessor, or any other device suitable for retrieval and execution of instructions. As an alternative or in addition to fetching, decoding, and executing instructions, the processing resource 301 may include one or more integrated circuits (ICs) or other electronic circuits that comprise a plurality of electronic components for performing the functionality described below. The functionality described below may be performed by multiple processors.

The machine-readable storage mediums 308, 309, and 310 may be any suitable storage device, such as self-encrypting storage devices, such as self-encrypting non-volatile memory devices. The machine-readable storage mediums 308, 309, and 310 may be NV-DIMM, a HDD, a SDD, and/or a flash memory card.

The machine-readable storage medium 302 may be a storage medium accessible to the processing resource 301. For example, the machine-readable storage medium 302 may be a machine-readable non-transitory storage medium. The machine-readable storage medium 302 may be, for example, a non-volatile memory device. The machine-readable storage medium 302 may include symmetrically encrypted first master passphrase key 303 and symmetrically encrypted second master passphrase key 304. The symmetrically encrypted first master passphrase key 303 may be encrypted based on an encryption key derived from first authentication information, and the symmetrically encrypted second master passphrase key 304 may be encrypted based on an encryption key derived from second authentication information. For example, the first authentication information may be associated with a first user, and the second authentication information may be associated with a second user. The different symmetrically encrypted passphrase keys may be encrypted using different methods. For example, the symmetrically encrypted first master passphrase key 303 may be encrypted using a first method, and the symmetrically encrypted second master passphrase 304 may be encrypted using a second method. The machine-readable storage medium passphrase keys may be symmetrically encrypted with a master passphrase encrypted using authentication information associated with a particular user such that the same authentication information may be used to create a decryption key for decrypting passphrase keys for storage devices associated with the particular user.

In one implementation, the computing system 300 includes multiple machine-readable storage mediums where different authentication information is used to encrypt a master key associated with different sets of non-volatile memory devices, such as where different machine-readable storage mediums are associated with different users. For example, the machine-readable storage medium 302 may include encrypted passphrase key 305 for machine-readable storage medium 308 encrypted with the first master passphrase key, encrypted passphrase key 306 for machine-readable storage medium 309 encrypted with the first master passphrase key, and encrypted passphrase key 307 for machine-readable storage medium 310 encrypted with the second master passphrase key. The machine-readable storage mediums 308 and 309 may be associated with a first user, and machine-readable storage medium 310 may be associated with a second user.

Figure 4:
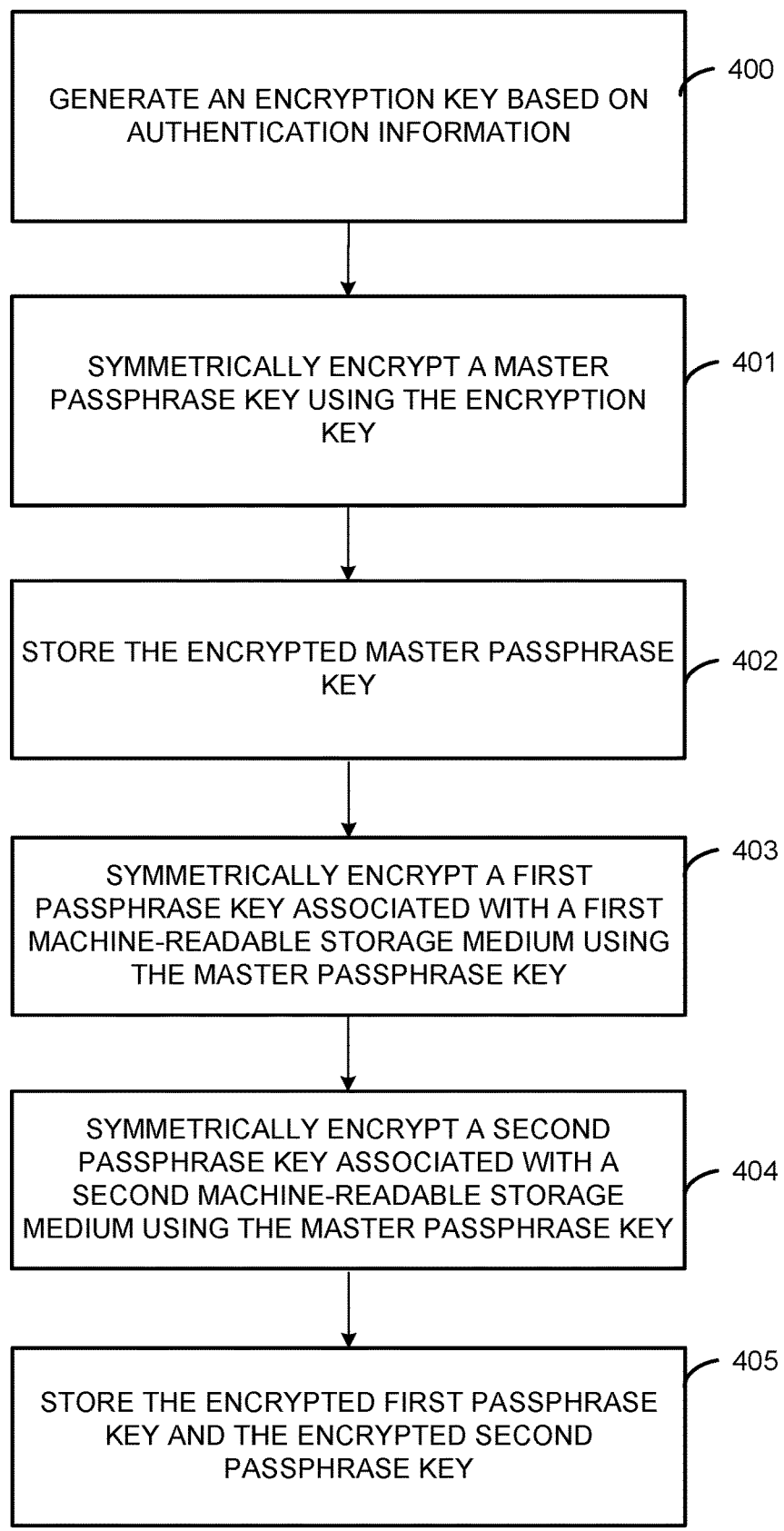
FIG. 4 is a flow chart illustrating one example of a method to symmetrically encrypt a master passphrase key.

FIG. 4 is a flow chart illustrating one example of a method to symmetrically encrypt a master passphrase key. In one implementation, an apparatus symmetrically encrypts a master passphrase key using authentication information, such as a user secret. The same authentication information may be used to derive a decryption key used to decrypt the master passphrase key. The master passphrase key may be used to encrypt passphrase keys associated with machine-readable storage mediums, such as self-encrypting devices. For example, the same authentication information may be used to decrypt the master passphrase key, which is used to transparently decrypt multiple machine-readable storage mediums. The method may be implemented, for example, by the computing system 100, 200, and/or 300 of FIGS. 1, 2, and 3, respectively.

Beginning at 400, a processing resource generates an encryption key based on authentication information. The processing resource may be, for example, platform firmware or a processor. The encryption key may be generated based on user authentication information, such as a password or biometric information. The encryption key may be derived using any suitable method. For example, the encryption key may be derived using a keyword derivation function, such as based on password hashing or PBKDF2. The encryption key may be generated by a device including multiple encrypted storage devices or may be generated by a remote device.

Continuing to 401, a processing resource symmetrically encrypts a master passphrase key using the encryption key. The master passphrase key may be any suitable encryption key. The master passphrase key may be associated with a particular device or may be generated to be associated with a particular user or set of users.

Continuing to 402, a processing resource stores the encrypted master passphrase key. The encrypted master passphrase key may be stored in any suitable device. In one implementation, the master passphrase key is stored in a non-volatile memory. The master passphrase key may be decrypted and the decrypted master passphrase key may be stored in volatile memory for use in decrypting other devices. In one implementation, the encrypted master passphrase key is transmitted to a remote key server for storage.

Continuing to 403, a processing resource symmetrically encrypts a first passphrase key associated with a first machine-readable storage medium using the master passphrase key. For example, an apparatus may include multiple self-encrypting storage devices such that each self-encrypting storage device has a different passphrase encryption used to access the particular storage device. A first machine-readable storage medium may have an associated first passphrase key that is used to access the device. The master passphrase key may be used to encrypt the first passphrase key in any suitable manner, such as using a symmetrical encryption method. The machine-readable storage device may be any suitable storage device, such as a non-volatile memory device.

Continuing to 404, a processing resource symmetrically encrypts a second passphrase key associated with a second machine-readable storage medium using the master passphrase key. For example, an apparatus may include the first and second machine-readable storage mediums. The self-encrypting storage devices may store different types of data and/or data associated with different users.

The apparatus may include any suitable number of machine-readable storage mediums. In one implementation, there are multiple master passphrase keys, such as where a first master passphrase key is used to encrypt passphrase keys associated with a first and second machine-readable storage medium, and a second master passphrase key is used to encrypt passphrase keys associated with a third and fourth machine-readable storage medium. The first master passphrase key may be symmetrically encrypted based on first authentication information, and the second master passphrase key may be symmetrically encrypted based on second authentication. The first authentication information may be associated with a first user, and the second authentication information may be associated with a second user.

In one implementation, the same master passphrase key may be encrypted and stored as multiple versions. For example, the master passphrase key may be symmetrically encrypted using an encryption key derived from first authentication information and stored for later use. The master passphrase key may be symmetrically encrypted using an encryption key derived from second authentication information and stored for later use. Both versions of the encrypted master passphrase key may be stored such that the associated user may unlock the version encrypted with the associated user information such that both users may have access to the machine-readable storage mediums with passphrase keys encrypted with the master passphrase key.

Continuing to 405, a processing resource stores the encrypted first passphrase key and the encrypted second passphrase key. For example, the encrypted first passphrase key and the encrypted second passphrase key may be stored in a non-volatile memory device. In one implementation, the stored encrypted master passphrase key, encrypted first passphrase key associated with a first machine-readable storage medium, and encrypted second passphrase key associated with a second machine-readable storage medium may be accessed for decryption and use.

Figure 5:
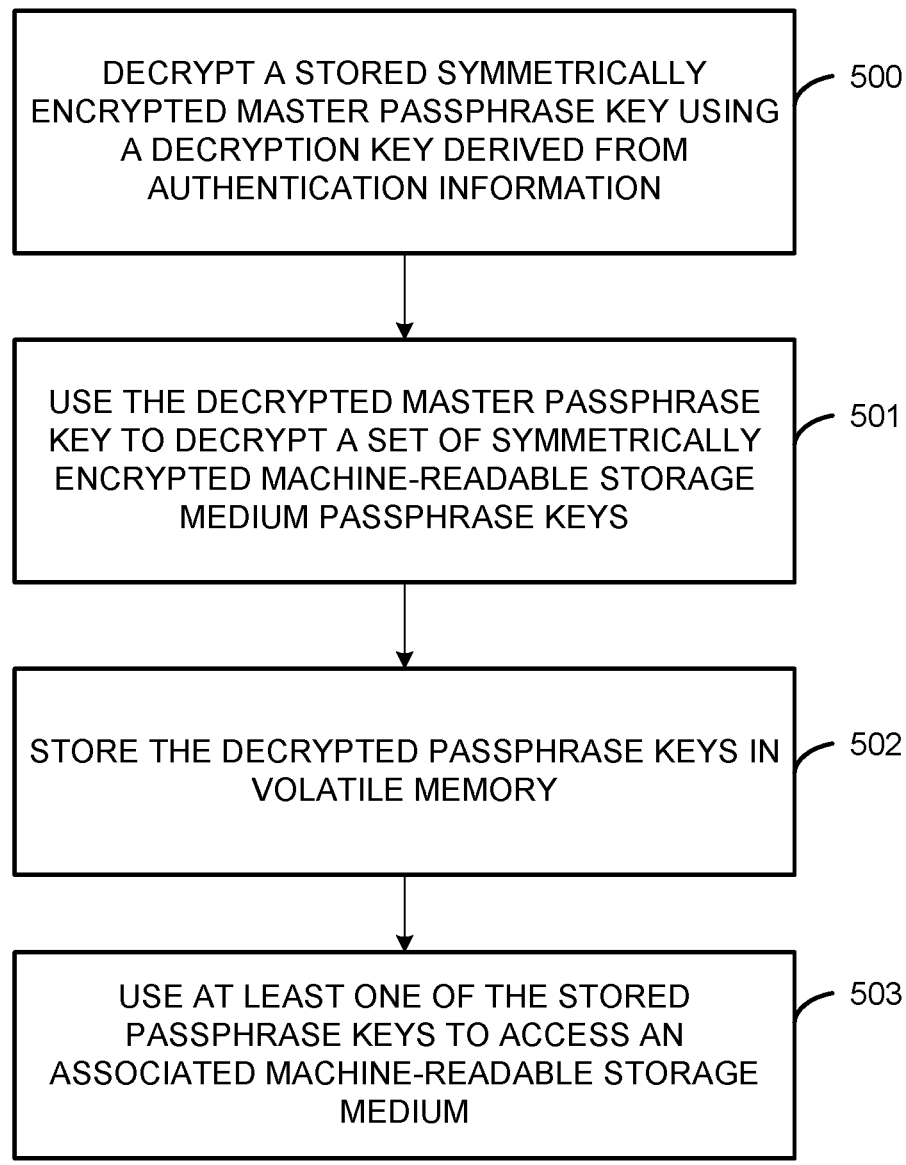
FIG. 5 is a flow chart illustrating one example of a method to decrypt a master passphrase key.

FIG. 5 is a flow chart illustrating one example of a method to decrypt a master passphrase key to access machine-readable storage mediums. For example, the decrypted master passphrase key may be used to decrypt passphrase keys associated with individual machine-readable storage mediums. The decrypted passphrase keys may be used to unlock the machine-readable storage mediums for read and/or write access. The method may be implemented, for example, by the apparatus 100, 200, or 300.

Beginning at 500, a processing resource decrypt a stored symmetrically encrypted master passphrase key using a decryption key derived from authentication information. The processing resource may be, for example, platform firmware in an apparatus including multiple encrypted machine-readable storage mediums with different passphrase keys.

The encryption key may be derived in any suitable manner. The authentication information may be, for example, a user password, secret, and/or biometric information. The authentication information may be received in any suitable manner, such as from a user. The authentication information may be a password associated with a device including the machine-readable storage mediums. For example, the authentication may be an operating system password associated with a particular user. The authentication information may be associated with a particular user such that the master passphrase key may be decrypted for a particular user. In one implementation, there are multiple encrypted versions of the master passphrase key, where each version is encrypted based on authentication information associated with a different user. The version of the master passphrase key encrypted for the particular user may be decrypted using the authentication information associated with the particular user.

The master passphrase key may be stored in any suitable location, such as in a volatile storage associated with an apparatus including the machine-readable storage mediums. For example, for security reasons, the unencrypted version of the master passphrase key may not be stored in permanent media or transmitted to a remote server, and the unencrypted master passphrase key storage may be limited to volatile memory.

Continuing to 501, a processing resource uses the decrypted master passphrase key to decrypt a set of symmetrically encrypted machine-readable storage medium passphrase keys. For example, the machine-readable storage medium passphrase keys may be encrypted by the master passphrase key and stored. The processing resource may decrypt the stored machine-readable storage medium passphrase keys. The encrypted machine-readable storage medium passphrase keys may be stored in a non-volatile memory device. The processing resource may decrypt a set of passphrase keys, such as those encrypted with the same master passphrase key and associated with the same user or user set.

Continuing to 502, a processing resource stores the decrypted passphrase keys in volatile memory. For example, at boot time, platform firmware may decrypt the passphrase keys associated with the machine-readable storage medium stored in non-volatile memory and store the decrypted passphrase keys in volatile memory for access when data is requested to be read and/or written to a particular one of the machine-readable storage devices.

Continuing to 503, a processing resource uses at least one of the stored passphrase keys to access an associated machine-readable storage medium. The processing resource may use a second passphrase key stored in volatile memory to access a second machine-readable storage medium. The passphrase key may be used to access a machine-readable storage medium if read and/or write access is requested by an application. Using a symmetrically encrypted master passphrase key to hierarchically encrypt passphrase keys for machine-readable storage mediums may allow for a transparent solution for storage device protection.

The invention claimed is:

1. A computing system, comprising:
a first non-transitory machine-readable storage medium associated with a first passphrase key used to unlock the first non-transitory machine-readable storage medium;
a second non-transitory machine-readable storage medium associated with a second passphrase key used to unlock the second non-transitory machine-readable storage medium;
a third non-transitory machine-readable storage medium to store:
a symmetrically encrypted master passphrase key;
an encrypted version of the first passphrase key encrypted using the master passphrase key;
an encrypted version of the second passphrase key encrypted using the master passphrase key; and
a processing resource to:
at least one of:
symmetrically encrypt the master passphrase key using an encryption key derived from authentication information; and
decrypt the stored master passphrase key using a decryption key derived from the authentication information;
wherein the authentication information is associated with a first user and wherein the third non-transitory machine-readable storage medium further stores an encrypted version of the master passphrase key symmetrically encrypted using an encryption key derived from second authentication information associated with a second user.

2. The computing system of claim 1, wherein the processing resource decrypts the stored master passphrase key and wherein the processing resource is further to:
decrypt the encrypted version of the first passphrase using the decrypted master passphrase key; and
access the first non-transitory machine-readable storage device using the first passphrase.

3. The computing system of claim 1, further comprising a fourth non-transitory machine-readable storage medium and wherein the fourth non-transitory machine-readable storage medium further stores:
an encrypted version of a second master passphrase key encrypted using a second encryption key derived from second authentication information; and
an encrypted version of a third passphrase key associated with the fourth non-transitory machine-readable storage medium encrypted using the second master passphrase key.

4. The computing system of claim 3, wherein the master passphrase key is encrypted using a first method and wherein the second master passphrase key is encrypted using a second method.

5. The computing system of claim 1, wherein the authentication information comprises an operating system password.

6. The computing system of claim 1, wherein the processing resource comprises platform firmware and wherein the first and second non-transitory machine-readable storage mediums comprise non-volatile memory devices.

7. The method of claim 1, wherein the first and second non-transitory machine-readable storage mediums comprise non-volatile memory devices.

8. A method, comprising:
associating a first non-transitory machine-readable storage medium with a first passphrase key used to unlock the first non-transitory machine-readable storage medium;
associating a second non-transitory machine-readable storage medium with a second passphrase key used to unlock the second non-transitory machine-readable storage medium;

storing, by a third non-transitory machine-readable storage medium, a symmetrically encrypted master passphrase key, an encrypted version of the first passphrase key encrypted using the master passphrase key, and an encrypted version of the second passphrase key encrypted using the master passphrase key; and at least one of:
- symmetrically encrypting a master passphrase key using an encryption key derived from authentication information; and
- decrypting the stored master passphrase key using a decryption key derived from the authentication information;
- wherein the authentication information is associated with a first user and wherein the third non-transitory machine-readable storage medium further stores an encrypted version of the master passphrase key symmetrically encrypted using an encryption key derived from second authentication information associated with a second user.

9. The method of claim 8, wherein the stored master passphrase key is decrypted and further comprising:
- decrypting the encrypted version of the first passphrase using the decrypted master passphrase key; and
- accessing the first non-transitory machine-readable storage device using the first passphrase.

10. The method of claim 8, further comprising storing, by a fourth non-transitory machine-readable storage medium, an encrypted version of a second master passphrase key encrypted using a second encryption key derived from second authentication information and an encrypted version of a third passphrase key associated with the fourth non-transitory machine-readable storage medium encrypted using the second master passphrase key.

11. The method of claim 8, wherein the master passphrase key is encrypted using a first method and wherein the second master passphrase key is encrypted using a second method.

12. The method of claim 8, wherein the authentication information comprises an operating system password.

13. A computing system, comprising:
- a first non-transitory machine-readable storage medium associated with a first passphrase key used to unlock the first non-transitory machine-readable storage medium;
- a second non-transitory machine-readable storage medium associated with a second passphrase key used to unlock the second non-transitory machine-readable storage medium;
- a third non-transitory machine-readable storage medium to store:
  - a symmetrically encrypted master passphrase key;
  - an encrypted version of the first passphrase key encrypted using the master passphrase key;
  - an encrypted version of the second passphrase key encrypted using the master passphrase key;
- a processing resource to:
  - at least one of:
- symmetrically encrypt the master passphrase key using an encryption key derived from authentication information; and
- decrypt the stored master passphrase key using a decryption key derived from the authentication information; and
- a fourth non-transitory machine-readable storage medium and wherein the fourth non-transitory machine-readable storage medium further stores:
  - an encrypted version of a second master passphrase key encrypted using a second encryption key derived from second authentication information; and
  - an encrypted version of a third passphrase key associated with the fourth non-transitory machine-readable storage medium encrypted using the second master passphrase key.

14. The computing system of claim 13, wherein the master passphrase key is encrypted using a first method and wherein the second master passphrase key is encrypted using a second method.

15. The computing system of claim 13, wherein the authentication information comprises an operating system password.

* * * * *